United States Patent
Williams et al.

(10) Patent No.: US 10,339,364 B2
(45) Date of Patent: Jul. 2, 2019

(54) APPARATUS AND METHOD FOR REJECTING ERRONEOUS OBJECTS OF EXTRUSION IN POINT CLOUD DATA

(71) Applicant: ClearEdge3D, Inc., Manassas, VA (US)

(72) Inventors: Kevin S. Williams, Manassas, VA (US); John S. Sloan, Manassas, VA (US)

(73) Assignee: CLEAREDGE3D, INC., Manassas, VA (US)

( * ) Notice: Subject to any disclaimer, the term of this patent is extended or adjusted under 35 U.S.C. 154(b) by 0 days.

(21) Appl. No.: 15/551,713

(22) PCT Filed: Feb. 26, 2016

(86) PCT No.: PCT/US2016/019973
§ 371 (c)(1),
(2) Date: Aug. 17, 2017

(87) PCT Pub. No.: WO2016/138501
PCT Pub. Date: Sep. 1, 2016

(65) Prior Publication Data
US 2018/0068169 A1    Mar. 8, 2018

Related U.S. Application Data (60) Provisional application No. 62/121,115, filed on Feb. 26, 2015.

(51) Int. Cl.
*G06T 17/00* (2006.01)
*G06K 9/00* (2006.01)
*G06F 17/18* (2006.01)

(52) U.S. Cl.
CPC .......... *G06K 9/00214* (2013.01); *G06T 17/00* (2013.01); *G06F 17/18* (2013.01); *G06T 2210/56* (2013.01)

(58) Field of Classification Search
None
See application file for complete search history.

(56) References Cited

U.S. PATENT DOCUMENTS 7,587,082 B1 *    9/2009   Rudin ............... G06K 9/00208
                                                              345/419
9,102,055 B1 *    8/2015   Konolige ................. B25J 9/163
(Continued)

OTHER PUBLICATIONS

International Search Report and Written Opinion for corresponding International PCT Application No. PCT/US16/19973, dated Jul. 22, 2016, p. 1 of 1.

(Continued)

*Primary Examiner* — Said Broome
(74) *Attorney, Agent, or Firm* — Hauptman Ham, LLP (57) ABSTRACT

A method of rejecting the presence of an object of extrusion within a point cloud. The method comprising receiving, through a data interface, data describing a set of measurements of observed portions of the one or more objects in the scene. The method further comprising receiving data describing an extruded object that is hypothesized to exist in the scene. The method further comprising finding a set of near measurement points comprising measurement points wherein each measurement point is within a predefined distance of the hypothesized extruded object. The method further comprising classifying points within the set of near measurement points associated with the hypothesized extruded object as on-surface or off-surface. The method further comprising rejecting the hypothesized extruded object whose off-surface measurement points exceed an allowable threshold.

20 Claims, 6 Drawing Sheets

(56) References Cited

U.S. PATENT DOCUMENTS

| | | |
|---|---|---|
| 2009/0103773 A1 | 4/2009 | Wheeler et al. |
| 2013/0051658 A1 | 2/2013 | Hwang et al. |
| 2013/0218472 A1 | 8/2013 | Fu et al. |
| 2014/0098094 A1* | 4/2014 | Neumann ............... G06T 17/10 345/420 |

OTHER PUBLICATIONS

Marton et al. "Reconstruction and Verification of 3D Object Models for Grasping" In: Conference: Robotics Research—The 14th International Symposium, ISRR 2009, Aug. 31-Sep. 3, 2009 [online] [retrieved on Apr. 28, 2016 (Apr. 28, 2016)) Retrieved from the Internet <URLhttps://www.researchgate.heVpublication/220757245_Reconstruction_and_Verification_of_3D_Object_Models_for_Grasping >,entire document, especially Abstract; Figure 4 and 8; pp. 6-10.

Guo et al. "Linear Combination Representation for Outlier Detection in Motion Tracking" In: Proceeding CVPR '05 Proceedings of the 2005 IEEE Computer Society Conference on Computer Vision and Pattern Recognition (CVPR'05)—vol. 2—vol. 02 pp. 274-281 [online] (retrieved on Apr. 28, 2016 (Apr. 28, 2016)) Retrieved from the Internet <URL: http://dl.acm.ory/i.;ilalion.cfm?Id=1069096>, entire document, especially Abstract; p. 2, col. 1; p. 3, col. 2; p. 5, col. 2.

\* cited by examiner

APPARATUS AND METHOD FOR REJECTING ERRONEOUS OBJECTS OF EXTRUSION IN POINT CLOUD DATA

BACKGROUND

Civil and mechanical engineering projects, GIS (Geographical Information Systems) mapping programs, military simulations, and numerous other applications all require accurate three dimensional (3D) computer models of real-world objects.

Most previous methods for creating 3D models involve extensive manual measurement and modeling. The measuring component may be achieved either through direct measurement (such as surveying) of the objects themselves or through measuring images of the objects using the science of photogrammetry. The modeling component typically involves manually inputting the measurements into computer modeling programs such as computer-aided design (CAD) software, GIS, or other similar solid modeling packages. This process is labor intensive and error prone.

Point cloud capture technology, such as laser scanning or automated photogrammetric stereo matching, is a relatively new technology for improving upon this 3D-modeling process. These systems scan objects or scenes to construct a "point cloud" consisting of many 3D point measurements of the scene. These points can then be used to guide the process of feature extraction.

Many companies need 3D virtual models of the piping, structural steel, ducting, and other critical elements within their industrial facilities, and it has become accepted practice to scan these facilities and create these 3D models using the resulting point cloud data. Towards this end, multiple software applications have been developed to enable manual, semi-automated, and fully-automated extraction of extruded objects to assist in the modeling of pipe networks, structural steel, and other common features. Fully-automated extraction is the most desirable approach for obvious reasons of cost savings. However, automated algorithms for extracting objects of extrusion from point cloud data can produce "false positives"—extracted objects that are not correct. For example, rounded edges on corners will result in a false positive for many naive automated cylinder extraction routines that simply test the mathematical fit of a cylinder to the scanned surface points. False positives typically need to be manually detected and removed from a model before it is finalized, thereby increasing costs.

It would therefore be desirable to develop a system, a method, and an apparatus able to automatically detect and delete erroneously extracted objects of extrusion.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

One or more embodiments provide a method of and an apparatus for rejecting hypothesized objects of extrusion. Various features associated with the operation of embodiments of the present invention will now be set forth. Prior to such description, a glossary of terms applicable for at least some embodiments is provided.

Scene: According to some embodiments, a scene includes or refers to a set of one or more physical objects.

Point Cloud: According to some embodiments, a point cloud is a collection of measurement points of a scene. These measurement points may be acquired using a laser scanner, photogrammetry, or other similar 3D measurement techniques.

3D Model: According to some embodiments, a 3D Model describes a set of points in a 3D space. In some embodiments, a 3D model is a collection of one or more faces that describe the boundary or a portion of the boundary of a set of one or more objects. For example, a 3D model that contains the top and bottom faces of a cube would be a 3D model that describes a portion of the boundary of the cube. Similarly, a 3D model that contains all six faces of a cube would be a 3D model that describes the (entire) boundary of the cube.

Figure 1:
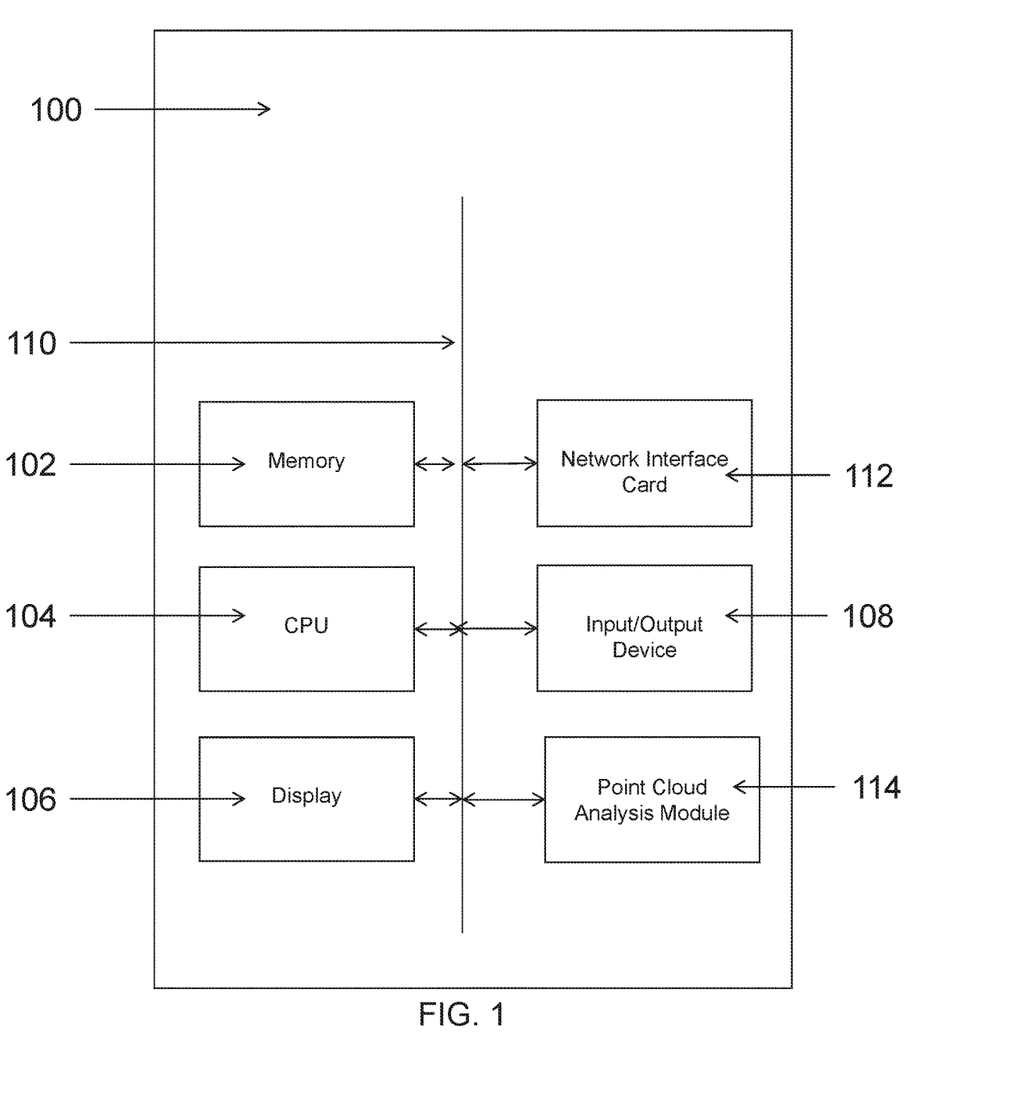
FIG. 1 is a high level block diagram of a computer configured in accordance with an embodiment of the present invention.

Virtual 3D Model: According to some embodiments, a virtual 3D Model includes a set of data, residing in a memory, e.g., a memory 102 of a computer system 100 as illustrated in FIG. 1, that describes a 3D Model.

Feature Extraction Algorithm: A set of steps that are performed to hypothesize the existence of an object within a scene and to provide data describing the shape of that object.

Object of Extrusion: According to some embodiments, an object of extrusion is formed by sweeping a 2D cross sectional shape through space along a path perpendicular to the plane of the cross section at any point along said path. For example, in some embodiments, a cylinder is an object of extrusion formed by sweeping a circular cross section through space along a straight line perpendicular to the plane of the circle. In some embodiments, an extrusion path is a straight line; in some embodiments an extrusion path is a circular path; in some embodiments an extrusion path is a helix. In some embodiments, a 2D cross sectional shape is rotated around the extrusion axis as it travels down the length of said extrusion axis. This list of embodiments is not exclusive; other forms of extrusion paths appear in other embodiments.

Hypothesized Object of Extrusion: According to some embodiments, objects of extrusion are hypothesized to exist in a scene based on analysis of a corresponding point cloud. For example, in some embodiments an automated feature extraction algorithm is used to analyze a point cloud to detect and extract data describing possible extruded objects such as cylinders. In some embodiments these extracted objects of extrusion are then hypothesized to exist in the scene, and each hypothesized object is subsequently accepted or rejected based on further analysis.

Data Interface: According to some embodiments, a data interface includes a portion of a computer system that allows data to be loaded onto the computer system. In some embodiments a Network Interface Card 112 operates as a data interface, allowing data to be loaded across a network. In some embodiments, an input/output device operates as a data interface. In some embodiments, a removable memory device or removable memory media operates as a data interface, allowing data to be loaded by attaching the device or by loading the media. This list of embodiments is not exclusive; other forms of a data interface appear in other embodiments.

The following paragraphs describe one or more embodiments for rejecting hypothesized objects of extrusion within a point cloud by analyzing the points in the vicinity of the object of extrusion. Some method embodiments receive, through a data interface, data describing a set of measurements of observed portions of one or more objects in a scene. Some method embodiments receive data describing an extruded object that is hypothesized to exist in a scene. Some method embodiments comprise finding measurement points near an extruded object. Some method embodiments comprise classifying nearby measurement points as on-surface or off-surface based on their distance from an extruded object. Some method embodiments comprise rejecting extruded object hypotheses whose ratio of off-surface measurement points versus on-surface points exceed an allowable ratio threshold. Some embodiments of the method are implemented in software, e.g., a set of instructions stored in a non-transitory medium for execution by a computer system, hardware, firmware, or a combination thereof.

FIG. 1 is a high level block diagram of a computer system 100 configured in accordance with some embodiments of the present invention, wherein the computer system 100 is programmed, e.g., executes a set of instructions stored, for example, in memory 102, with a method according to some embodiments, e.g., the method described in connection with FIG. 2. In some embodiments, the computer system 100 includes components suitable for use in 3D modeling. In some embodiments, the computer system 100 includes one or more of various components, such as memory 102, a central processing unit (CPU) or controller 104, a display 106, input/output devices 108, and/or a bus 110. In some embodiments, the CPU comprises one or more individual processing units. In some embodiments, the bus 110 or another similar communication mechanism transfers information between the components of the computer system, such as memory 102, CPU 104, display 106 and/or input/output devices 108. In some embodiments, information is transferred between some of the components of the computer system or within components of the computer system via a communications network, such as a wired or wireless communication path established with the internet, for example. In some embodiments the memory 102 includes a non-transitory, computer readable, storage medium. In some embodiments, the memory 102 includes a volatile and/or a non-volatile computer readable storage medium. In some embodiments, memory 102 stores a set of instructions to be executed by the CPU 104. In some embodiments, memory 102 is also used for storing temporary variables or other intermediate information during execution of instructions to be executed by the CPU 104. In some embodiments, the instructions to be executed by the CPU 104 are stored in a portion of the memory 102 that is a non-transitory, computer readable, storage medium. In some embodiments, the instructions for causing a CPU 104 and computer system 100 to perform the described steps and tasks can be located in memory 102. In some embodiments, these instructions can alternatively be loaded from a disk and/or retrieved from a remote networked location. In some embodiments, the instructions reside on a server, and are accessible and/or downloadable from the server via a data connection with the data interface. In some embodiments, the data connection may include a wired or wireless communication path established with the Internet, for example.

In some embodiments, a Network Interface Card (NIC) 112 is included in the computer system 100, and provides connectivity to a network (not shown), thereby allowing the computer system 100 to operate in a networked environment. In some embodiments, computer system 100 is configured to receive data such as measurements that describe portions of a scene through the NIC 112 and/or the input/output devices 108.

In some embodiments, the memory 102 includes one or more executable modules to implement operations described herein. In some embodiments, the memory 102 includes a Point Cloud Analysis module 114. In some embodiments, the Point Cloud Analysis module 114 includes software for analyzing a set of point cloud data, an example of such software includes EdgeWise™ which is commercially available from ClearEdge 3D, Manassas, Va. In some embodiments, the Point Cloud Analysis module 114 also includes executable instructions for constructing a virtual 3D model of one or more objects within a scene. The operations performed by such a Point Cloud Analysis module 114 are discussed in greater detail in connection with FIG. 2 below.

It should be noted that the Point Cloud Analysis module 114 is provided by way of example. In some embodiments, additional modules, such as an operating system or graphical user interface module are also included. It should be appreciated that the functions of the modules may be combined. In addition, the functions of the modules need not be performed on a single machine. Instead, the functions may be distributed across a network, if desired. Indeed, some embodiments of the invention are implemented in a client-server environment with various components being implemented at the client-side and/or server-side.

In some embodiments, the CPU 104 processes information and instructions, e.g., stored in memory 102.

In some embodiments, the computer system 100 further comprises a display 106, such as a liquid crystal display (LCD), cathode ray tube (CRT), or other display technology, for displaying information to a user. In some embodiments, a display 106 is not included as a part of computer system 100. In some embodiments, the computer system 100 is configured to be removably connected with a display 106.

In some embodiments, the memory 102 comprises a static and/or a dynamic memory storage device such as a hard drive, optical and/or magnetic drive, and similar storage devices for storing information and/or instructions. In some embodiments, a static and/or dynamic memory storage device and/or media 102 is configured to be removably connected with the computer system 100. In some embodiments, data such as measurements that describe portions of a scene are received by loading a removable media onto memory storage device 102, for example by placing an optical disk into an optical drive, a magnetic tape into a magnetic drive, or similar data transfer operations. In some embodiments, data such as measurements that describe portions of a scene are received by attaching a removable static and/or dynamic memory storage device 102, such as a hard drive, optical, and/or magnetic drive, etc. to the computer system 100. In some embodiments, data such as measurements that describe portions of a scene are received through NIC 112 or Input/Output Devices 108.

Figure 2:
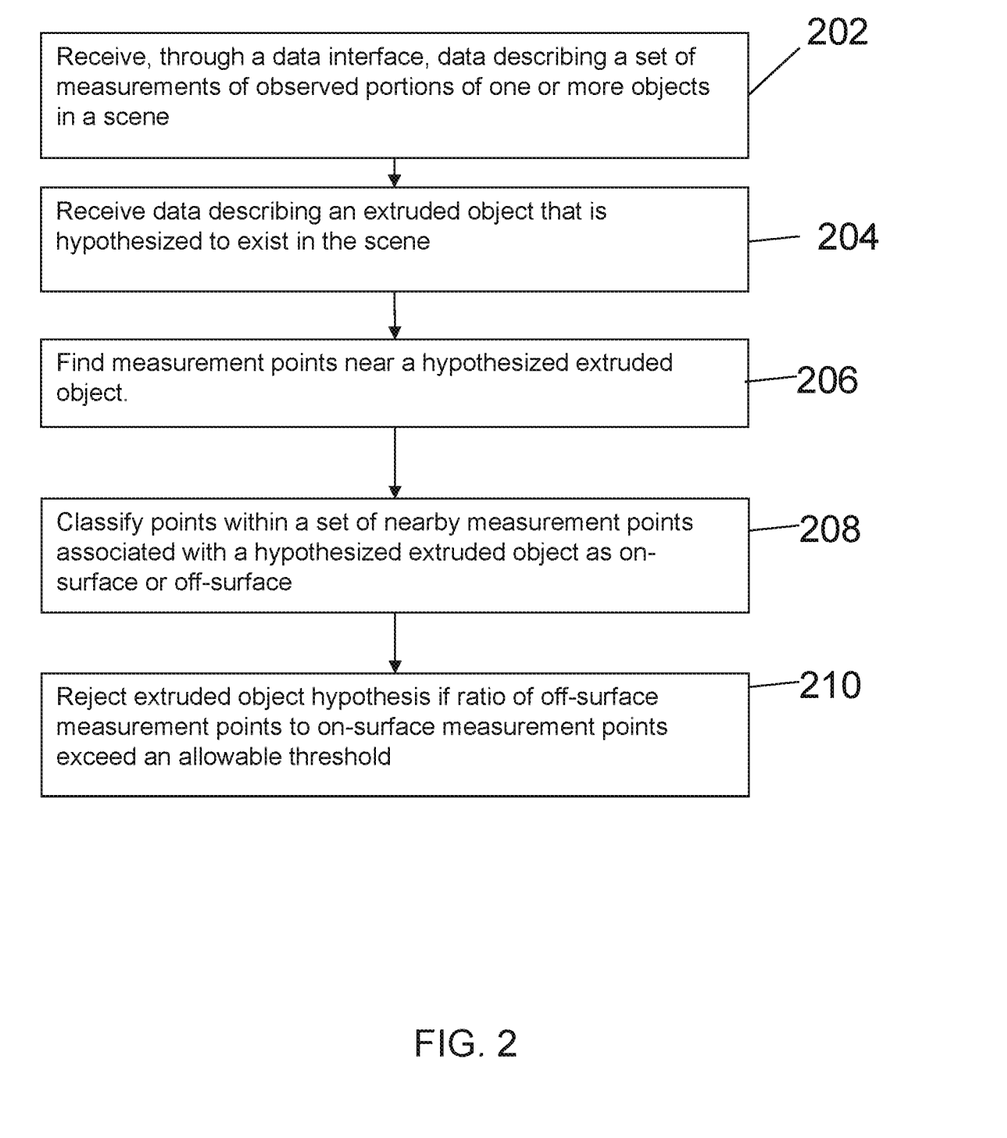
FIG. 2 is a flowchart of processing operations for rejecting a hypothesized object of extrusion based on evidence from nearby points in a point cloud, in accordance with an embodiment of the present invention.

FIG. 2 is a flowchart of processing operations for rejecting virtual 3D objects of extrusion which are hypothesized to exist within a scanned point cloud of a scene, in accordance with one or more embodiments of the invention. An exemplary set of operations (202-210) for rejecting hypothesized virtual 3D objects of extrusion is discussed in detail below. In some embodiments, some or all of the exemplary set of operations (202-210) are stored in memory 102 as a sequence of instructions for execution by CPU 104.

Operation of Receiving, Through a Data Interface, Data Describing a Set of Measurements of Observed Portions of the One or More Objects in a Scene An operation to receive, through a data interface, data describing a set of measurements of observed portions of the one or more objects in the scene is performed (block 202). In some embodiments, a computer system receives, through a data interface, a data set describing a set of measurements of observed portions of one or more objects in a scene. For example, in some embodiments a data file containing a set of one or more laser scans may be loaded onto a computer system 100 through a network interface card 112 and stored in memory 102 as illustrated in FIG. 1. As another example, in some embodiments an optical storage disk containing photogrammetric measurements of a factory are placed in an optical disk drive.

In some embodiments, a cloud of point measurements of a scene (which in some embodiments is called a "point cloud") is loaded into the memory 102 of a computing device 100 for processing as illustrated in FIG. 1.

It should be noted that this is not an exclusive list of embodiments of this portion of the invention, other embodiments are possible.

Operation of Receiving Data Describing an Extruded Object that is Hypothesized to Exist in a Scene An operation to receive data describing an extruded object that is hypothesized to exist in the scene is performed (block 204). In some embodiments, a computer system receives a data set describing an extruded object that is hypothesized to exist in a scene. For example, in some embodiments a feature extraction algorithm is used to detect possible objects of extrusion within a point cloud, and the computer system then receives data describing a hypothesized object of extrusion detected by the algorithm. In some embodiments, a data file containing a set of one or more hypothesized objects of extrusion may be loaded onto a computer system 100 through a network interface card 112 and stored in memory 102 as illustrated in FIG. 1.

It should be noted that this is not an exclusive list of embodiments of this portion of the invention, other embodiments are possible.

Operation of Finding Measurement Points Near a Hypothesized Extruded Object

An operation to find a set of nearby measurement points associated with a hypothesized extruded object is performed (block 206). In some embodiments, a point cloud is analyzed to find a set of measurement points which are near a hypothesized extruded object. In some embodiments, the "nearby points" include all points within a predefined distance from the hypothesized, extruded object. In some embodiments, this predefined distance is proportional to the size of the hypothesized object. In some embodiments, the predefined distance is proportional to the error in the measurement data. In some embodiments, the predefined distance is a fixed value. In some embodiments, the predefined distance is a user-determined value.

In some embodiments, a set of nearby measurement points are found based on the distance to the nearest surface of the hypothesized extruded object. In some embodiments, a set of nearby measurement points are found based on pre-assigning points to a grid pattern and finding points that correspond to grid cells near the hypothesized object of extrusion. In some embodiments, one or more point clouds are organized in a gridded or octree structure to facilitate faster searching for a set of nearby measurement points. In some embodiments, distance metrics used for finding a set of nearby measurement points include Euclidean distance, Mahalanobis distance, Manhattan distance, and/or other distance metrics.

Figure 3:
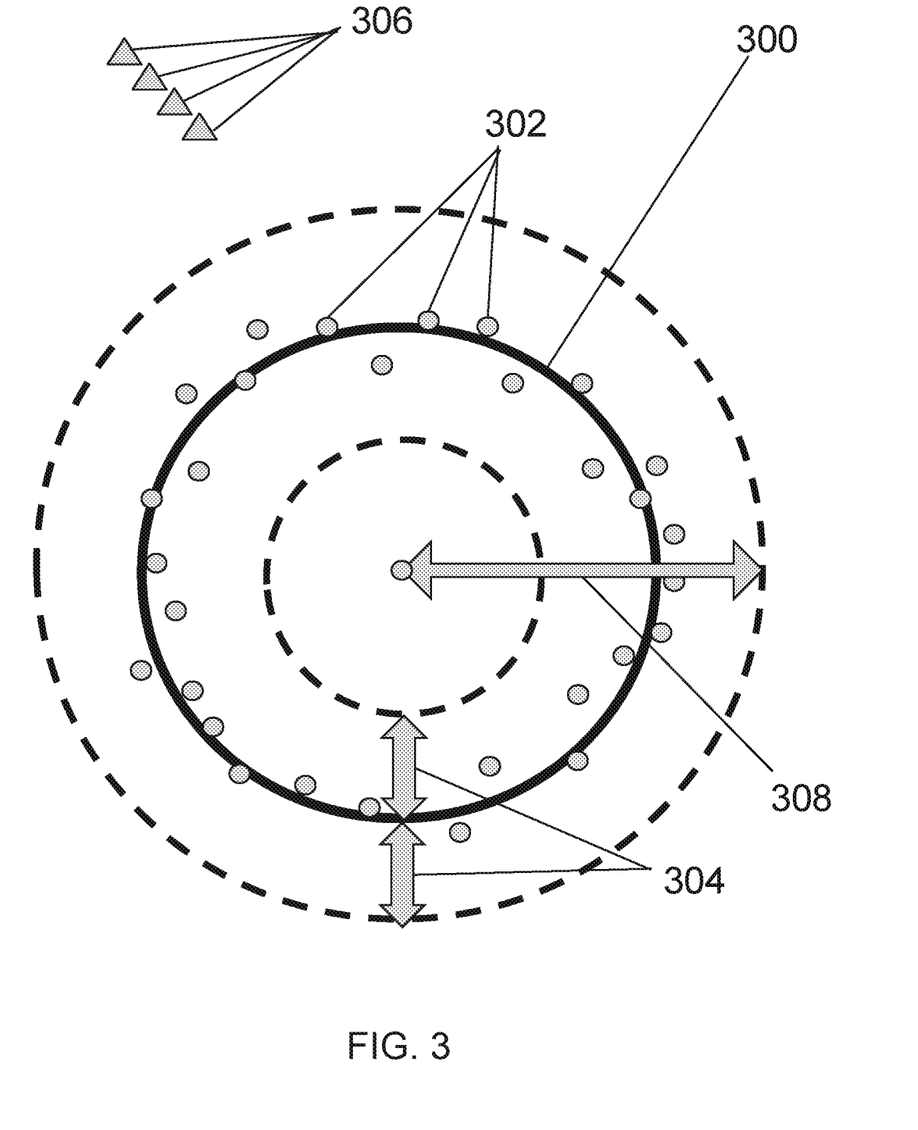
FIG. 3 is a two dimensional (2D) cross section of a cylinder along with nearby points from a corresponding point cloud, and illustrates the process of selecting a subset of the point cloud based on proximity to the cylinder in accordance with an embodiment of the present invention.

FIG. 3 illustrates a cross-sectional view of a cylinder, which in some embodiments is a circle (300). In some embodiments, a set of nearby measurement points (302) are found that fall within a predefined distance (304) on either side of the surface of that cylinder. In some embodiments, points (306) that fall outside of the defined distance (304) from the cylinder's surface are ignored.

In some embodiments, a set of nearby measurement points within a defined distance (308) from the centerline of each extruded object are found, without regard for the distance to the surface of the extruded object.

In some embodiments, a set of nearby measurement points within a defined distance from another axis (not shown) of the extruded object (such as the neutral axis for a structural steel member) are found.

It should be noted that this is not an exclusive list of embodiments of this portion of the invention, other embodiments are possible.

Operation of Classifying Points within a Set of Nearby Measurement Points Associated with a Hypothesized Extruded Object as On-Surface or Off-Surface An operation is performed to classify points within a set of nearby measurement points associated with a hypothesized extruded object as on-surface or off-surface (block 208).

In some embodiments, points are labeled as on-surface if they are closer than a predetermined distance to the extruded object. In some embodiments, the predetermined distance is proportional to the error in the measurement data. In some embodiments, the predetermined distance is proportional to the size of the extruded object. In some embodiments, the predetermined distance is proportional to the size of the cross-section of the extruded object. In some embodiments, the predetermined distance is a fixed value. In some embodiments, the predetermined distance is user specified. It should be noted that this is not an exclusive list of embodiments of this portion of the invention, other embodiments are possible.

In some embodiments, points are labeled as off-surface if they are farther than a predetermined distance to the extruded object. In some embodiments, the predetermined distance is proportional to the error in the measurement data. In some embodiments, the predetermined distance is proportional to the size of the extruded object. In some embodiments, the predetermined distance is proportional to the size of the cross-section of the extruded object. In some embodiments, the predetermined distance is a fixed value. In some embodiments, the predetermined distance is user specified. It should be noted that this is not an exclusive list of embodiments of this portion of the invention, other embodiments are possible.

Figure 4:
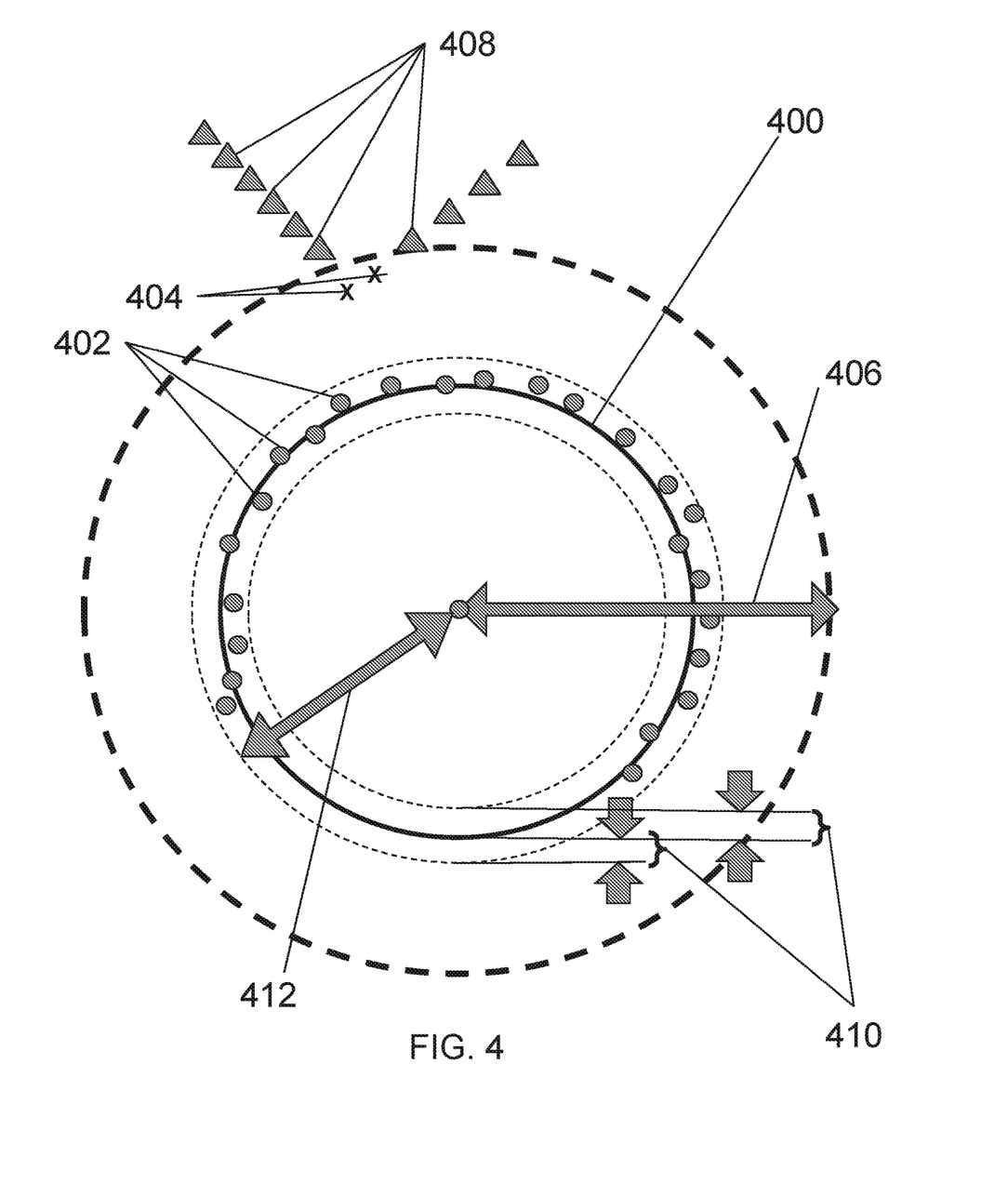
FIG. 4 is a 2D cross section of a cylinder along with nearby points from a corresponding point cloud, and illustrates the process of classifying points as on-surface or off-surface in accordance with an embodiment of the present invention.

FIG. 4 is a cross-sectional view of a cylinder (400), along with nearby points (402, 404) found within a predetermined distance from the central axis of the cylinder (406) according to block 206, and points (408) that are further away from the central axis, which in some embodiments are ignored. In some embodiments, the nearby points (402, 404) are classified as on-surface (402) if they are within the on-surface distance (410) from the surface of an extruded object, and off-surface (404) if they are outside of this on-surface distance.

In some embodiments, points are given weighted classifications along a continuum between on-surface and off-surface based on their distance to the extruded object.

In some embodiments, points are classified as on-surface or off-surface based on their distance to the centerline of the extruded object (412). In some embodiments, points are classified as on-surface or off-surface based on their distance to another axis of the extruded object (such as the neutral axis for a structural steel member).

It should be noted that this is not an exclusive list of embodiments of this portion of the invention, other embodiments are possible.

Operation of Rejecting Extruded Object Hypothesis if Ratio of Off-Surface Measurement Points to On-Surface Measurement Points Exceed an Allowable Ratio Threshold An operation to reject an extruded object hypothesis if the ratio of off-surface measurement points to on-surface measurement points exceed an allowable ratio threshold is then performed (block 210). In some embodiments, the ratio of the number of off-surface points to on-surface points is calculated, and if this value exceeds a maximum allowable ratio threshold, the extruded object hypothesis is rejected. In at least some embodiments, if the ratio of the number of off-surface points to on-surface points does not exceed the maximum allowable ratio threshold, the extruded object hypothesis is not rejected.

Figure 5:
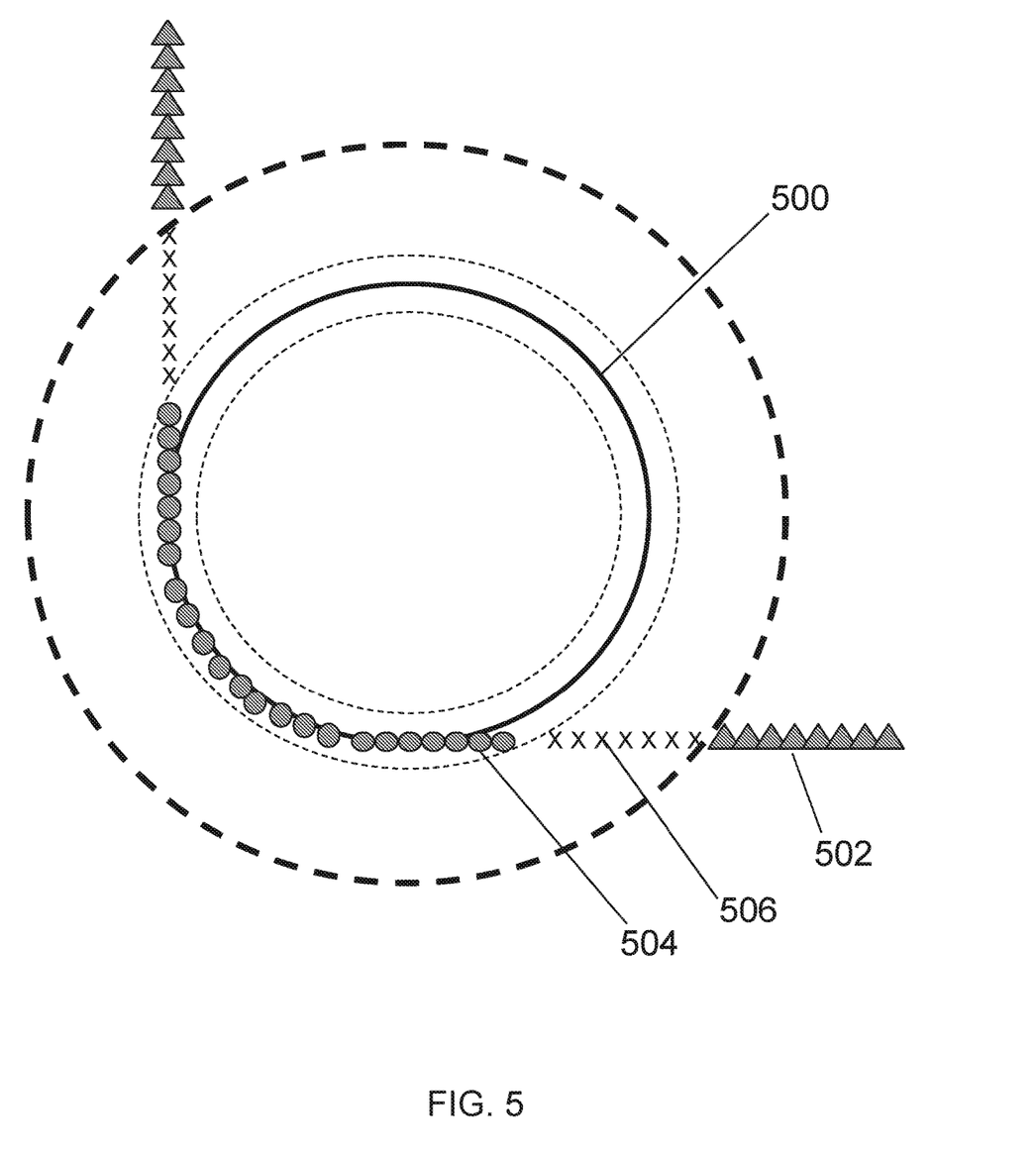
FIG. 5 is a 2D cross section of a cylinder during the process of rejecting a false positive detection of a cylinder along a rounded corner based on the ratio of off-surface points to on-surface points in accordance with an embodiment of the present invention.

FIG. 5 is an example of a cross-sectional view of a cylinder (500) hypothesized to exist at a location where there is a rounded corner rather than a full cylinder. FIG. 5 shows the measurement points (502, 504, 506) associated with the surfaces of the rounded corner. In some embodiments, the number of off-surface points (506) is compared to the number of on-surface points (504), and if the ratio is higher than an allowable ratio threshold, the hypothesized extruded object is rejected. In the case of some embodiments illustrated by FIG. 5, there are 14 off-surface points and 23 on-surface points. In the case of some embodiments illustrated by FIG. 5, a threshold less than 14/23 would be sufficient to correctly reject this hypothesized cylinder.

Figure 6:
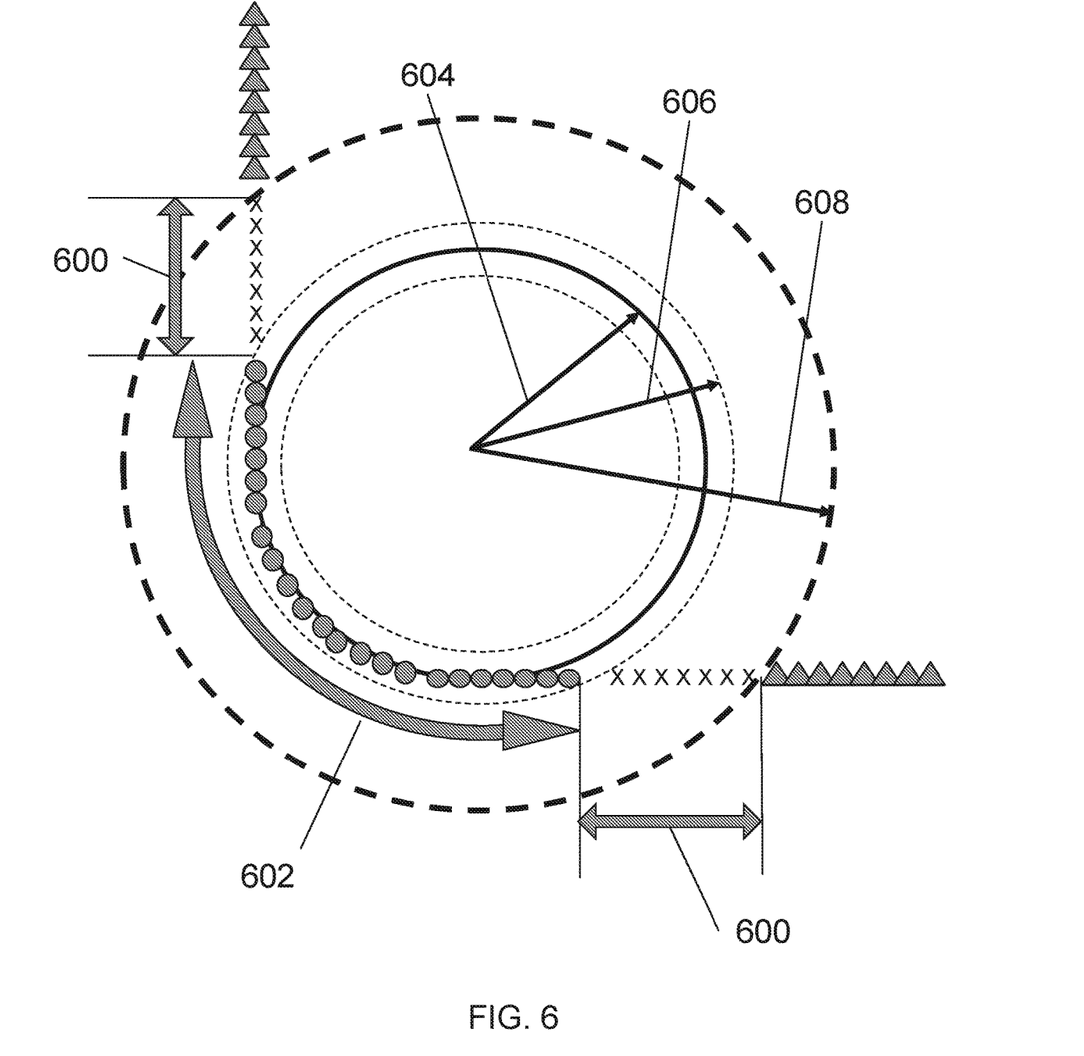
FIG. 6 is a 2D cross section of a cylinder during the process of rejecting a hypothesized cylinder in accordance with an embodiment of the present invention.

In some embodiments, the point measurements within a point cloud are approximated as having a uniform distribution across a given surface. In some embodiments, a uniform distribution of points causes the calculation of an appropriate off-surface-to-on-surface ratio threshold, since the ratio of off-surface surface area to on-surface surface area is often readily calculated for commonly encountered erroneous geometries. FIG. 6 illustrates the same geometry from FIG. 5, where in some embodiments the off-surface surface area (600) and the on-surface surface area (602) can be readily derived as a function of the hypothesized cylinder's radius (604), the hypothesized cylinder's length, the search distance (308, 608), and the on-surface distance tolerance (410, 606). In some embodiments, the expected ratio of off-surface surface area (600) to on-surface surface area (602) for commonly encountered erroneous geometries (such as a rounded corner when searching for a cylinder) is used to derive an allowable threshold for operation (210).

In FIG. 6, the on-surface surface area is, in some embodiments, derived through simple geometry to be equal to:

$$l\left(\frac{\pi r}{2} + 2\sqrt{A^2 - r^2}\right)$$

where l is the length of the cylinder, r is the radius of the cylinder (604), and A is the distance from the center of the circle to the outer radius of the on-surface tolerance (410, 606). Likewise, the off-surface surface area is, in some embodiments, derived as:

$$2l(\sqrt{B^2 - r^2} - \sqrt{A^2 - r^2})$$

where B is the search radius (308, 608).

In some embodiments, it is desirable to reject hypothesized cylinders occurring at rounded corners as displayed in FIG. 6, and so the allowable threshold for the ratio of off-surface to on-surface points is chosen such that it is less than:

$$\frac{2(\sqrt{B^2 - r^2} - \sqrt{A^2 - r^2})}{\frac{\pi r}{2} + 2\sqrt{A^2 - r^2}}$$

In some embodiments, translation symmetry in the extrusion direction of a hypothesized extruded object is used to eliminate the length of the hypothesized object from a derivation of an allowable threshold for operation (210).

In some embodiments, a weighted sum of off-surface points is compared to a weighted sum of on-surface points, and if the ratio is higher than an allowable ratio threshold the hypothesized extruded object is rejected. In some embodiments, the allowable ratio threshold is 33%. In at least some embodiments, the allowable ratio threshold is less than 50%. In at least some embodiments, the allowable ratio threshold is 25%.

In some embodiments, the hypothesized extruded object is rejected if the number of off-surface points is greater than a maximum allowed number of off-surface points without regard to the number of on-surface points.

In some embodiments, the allowable threshold for the ratio of off-surface to on-surface points is chosen a priori. In some embodiments, the allowable threshold for the ratio of off-surface to on-surface points is chosen at the time of analysis. In some embodiments, the allowable threshold for the ratio of off-surface to on-surface points is chosen based on the results of calculating the ratio for incorrectly and/or correctly hypothesized objects in a data set and choosing a threshold value which optimizes the accuracy of the rejection of hypothesized objects.

An example of a given embodiment is useful to describe the operation of at least one embodiment of the above operations. In this embodiment, execution of a software application by a processor causes the processor to load a set of laser scan point measurements of a scene, such as an industrial plant, which contains one or more pipes which are roughly cylindrical in shape. Execution of the application by the processor then causes the processor to execute instructions which perform a feature extraction algorithm, resulting in a hypothesis that one or more cylindrical objects exist within the scene along with data to describe the cylinders. The application then causes the processor to execute instructions which use the data for each cylinder to find a set of measurement points that are near the corresponding hypothesized object, and further classify these points as on-surface or off-surface based on their distance from the axis of the cylinder. The application then causes the processor to execute instructions which calculate the ratio of off-surface to on-surface points for each hypothesized object, and compare that ratio to a predetermined threshold. Execution of the application by the processor then causes the processor to execute instructions which reject those hypothesized objects for which the ratio the count of off-surface points to that of on-surface points is greater than the predetermined threshold and accepts those hypothesized objects for which the ratio is less than or equal to the predetermined threshold, where the predetermined threshold was determined during application development by calculating the ratio in trial data sets and choosing a value that was judged to reject many incorrectly hypothesized objects while not erroneously rejecting too many correctly hypothesized objects. Execution of the application by the processor then causes the processor to execute instructions which creates a virtual solid model of the accepted hypothesized objects based on the corresponding cylindrical geometries and saves that virtual solid model to a storage device such as a hard disk drive.

It should be noted that this is not an exclusive list of embodiments of this portion of the invention, other embodiments are possible.

Accurately rejecting hypothesized objects of extrusion is a challenge for automated or semi-automated modeling of scanned scenes. A robust method for accurately rejecting hypothesized objects of extrusion allows automated feature extraction to become an economically attractive alternative for large-scale applications.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. Those skilled in the art should also realize that such equivalent constructions do not depart from the spirit and scope of the present disclosure, and that they may make various changes, substitutions, and alterations herein without departing from the spirit and scope of the present disclosure. It is therefore intended that the protection granted hereon be limited only by the definition contained in the appended claims and equivalents thereof.

The invention claimed is:

1. A method of rejecting the presence of an object of extrusion within a point cloud, said method comprising the steps of:
   receiving, through a data interface, data describing a set of measurements of observed portions of the one or more objects in the scene;
   receiving data describing a predicted extruded object in the scene;
   finding a set of near measurement points comprising measurement points wherein each measurement point is within a predefined distance of the predicted extruded object;
   classifying points within the set of near measurement points associated with the predicted extruded object as on-surface or off-surface; and
   rejecting the predicted extruded object whose ratio of off-surface measurement points to on-surface measurement points exceeds an allowable threshold.

2. The method of claim 1, where a feature extraction algorithm is used to produce the data describing the predicted extruded object.

3. The method of claim 1, where the data describing the predicted extruded object describes a cylinder.

4. The method of claim 1, where the allowable threshold is chosen based on a calculation of the on-surface and off-surface surface areas for one or more possible erroneous geometries.

5. The method of claim 1, where the allowable threshold is chosen to optimize correct classification of a known dataset.

6. The method of claim 1, wherein a feature extraction algorithm is used to produce the data describing the predicted extruded object, and where the data describing the predicted extruded object describes a cylinder, and where the allowable threshold is chosen based on optimizing correct classification of a known dataset.

7. The method of claim 1, wherein finding a set of near measurement points further comprises each measurement point being within a predefined distance of the centerline of the predicted extruded object.

8. A system for rejecting the presence of an object of extrusion within a point cloud, the system comprising:
   a processor; and
   a memory storing instructions which, when executed by the processor, cause the processor to:
      receive, through a data interface, data describing a set of measurements of observed portions of the one or more objects in the scene;
      receive data describing predicted extruded object in the scene;
      find a set of near measurement points comprising measurement points wherein each measurement point is within a predefined distance of the predicted extruded object;
      classify points within the set of near measurement points associated with the predicted extruded object as on-surface or off-surface; and
      reject the predicted extruded object whose ratio of off-surface measurement points to on-surface measurement points exceeds an allowable threshold.

9. A non-transitory memory or a non-transitory computer-readable medium storing instructions which, when executed by a processor, cause the processor to:
   receive, through a data interface, data describing a set of measurements of observed portions of the one or more objects in the scene;

receive data describing predicted extruded object in the scene;

find a set of near measurement points comprising measurement points wherein each measurement point is within a predefined distance of the predicted extruded object;

classify points within the set of near measurement points associated with the predicted extruded object as on-surface or off-surface; and reject the predicted extruded object whose ratio of off-surface measurement points to on-surface measurement points exceeds an allowable threshold.

10. The method of claim 1, wherein the predefined distance is proportional to the size of the predicted object.

11. The method of claim 1, wherein the predefined distance is proportional to the error in the measurement data.

12. The method of claim 1, wherein the predefined distance is based on a distance to the nearest surface of the predicted object.

13. The system of claim 8, wherein the memory further stores instructions which, when executed by the processor, cause the processor to perform feature extraction on the data describing the set of measurements of the one or more objects in the scene to produce the data describing the predicted extruded object.

14. The system of claim 8, wherein the data describing the predicted extruded object describes a cylinder.

15. The system of claim 8, wherein the allowable threshold is chosen based on a calculation of the on-surface and off-surface surface areas for one or more possible erroneous geometries.

16. The system of claim 8, wherein the instructions to find a set of near measurement points further comprise each measurement point being within a predefined distance of the centerline of the predicted extruded object.

17. The non-transitory memory or the non-transitory computer-readable medium of claim 9, wherein the predefined distance is proportional to the size of the predicted object.

18. The non-transitory memory or the non-transitory computer-readable medium of claim 9, wherein the predefined distance is proportional to the error in the measurement data.

19. The non-transitory memory or the non-transitory computer-readable medium of claim 9, wherein the predefined distance is based on a distance to the nearest surface of the predicted object.

20. The non-transitory memory or the non-transitory computer-readable medium of claim 9, wherein the non-transitory memory or non-transitory medium further stores instructions which, when executed by the processor, cause the processor to perform feature extraction on the data describing the set of measurements of the one or more objects in the scene to produce the data describing the predicted extruded object.

* * * * *